United States Patent
Stein

(10) Patent No.: US 6,605,950 B2
(45) Date of Patent: Aug. 12, 2003

(54) METHOD AND APPARATUS FOR MEASURING FILM THICKNESSES

(75) Inventor: Markus Stein, Gevelsberg (DE)

(73) Assignee: Plast-Control Gerätebau GmbH, Remscheid (DE)

( * ) Notice: Subject to any disclaimer, the term of this patent is extended or adjusted under 35 U.S.C. 154(b) by 0 days.

(21) Appl. No.: 09/931,835

(22) Filed: Aug. 17, 2001

(65) Prior Publication Data

US 2002/0021134 A1 Feb. 21, 2002

(30) Foreign Application Priority Data

Aug. 19, 2000 (EP) .............................. 00117871

(51) Int. Cl.⁷ .............................................. G01R 27/26
(52) U.S. Cl. ......................................... 324/671; 73/159
(58) Field of Search ................................ 324/671, 661, 324/662, 686, 688, 690, 663; 73/159

(56) References Cited

U.S. PATENT DOCUMENTS

| | | | |
|---|---|---|---|
| 3,764,899 A | * 10/1973 | Peterson et al. ............ | 324/671 |
| 5,065,106 A | * 11/1991 | Hendrick et al. ........... | 324/663 |
| 5,101,166 A | 3/1992 | Oestreich et al. ........... | 324/671 |
| 5,223,797 A | 6/1993 | Mayer et al. ................ | 324/688 |
| 6,388,452 B1 | * 5/2002 | Picciotto ..................... | 324/663 |

FOREIGN PATENT DOCUMENTS

| | | |
|---|---|---|
| DE | 4009982 | 10/1991 |
| DE | 19511939 | 10/1996 |
| DE | 19632385 | 3/1997 |

\* cited by examiner

*Primary Examiner*—John E. Chapman
*Assistant Examiner*—James C. Kerveros
(74) *Attorney, Agent, or Firm*—Richard M. Goldberg

(57) ABSTRACT

A method for measuring the film thickness with the help of a measuring head (12), which is held with a holding device (14) against the film (10), so that the latter is deflected, wherein the reaction force (F), exerted by the film (10) on the measuring head (12), is measured and controlled to a specified nominal value by the movement of the measuring head.

18 Claims, 3 Drawing Sheets

METHOD AND APPARATUS FOR MEASURING FILM THICKNESSES

BACKGROUND OF THE INVENTION

The invention relates to a method and an apparatus for measuring film thicknesses with the help of a measuring head, which is held with a holding device against the film in such a manner, that the latter is deflected.

Such methods are used particularly for the manufacture of plastic films, so that the film thickness and, optionally, the uniformity of the film thickness over the width of the film can be monitored during the manufacturing process and, if necessary, controlled. For example, in the case of a blown film installation, the measuring head is disposed in such a manner at the film bubble, which is inflated by air blown in and pulled off in the upward direction, that it can move in a circle about the film and, during a revolution, measure the film thickness on the whole periphery of the film bubble. Since it is difficult, particularly in the case of blown film, to dispose the measuring head on both sides of the film, the measuring head should be configured so that the measurement can take place from one side of the film. This can be realized using different measurement principles, for example, with capacitive measurement methods. However, in the case of conductive films, inductive methods also come into consideration and, in the case of transparent films also optical methods.

Capacitive methods are known, for which the sensor is in contact directly with the surface of the film. In the U.S. Pat. No. 5,223,797, a capacitive measuring head is described, which has the shape of a rotatable drum and rolls on the surface of the film. If, as is usually the case, the film moves relative to the sensor, this has the advantage that damage to the film surface resulting from direct contact with the sensor is avoided or, at the very least, decreased. In any case, a certain length of film should lie in contact with the surface of the measuring head, so that a precise and accurate measurement of the thickness becomes possible. For this reason, the measuring head is pressed slightly against the film, so that the film is deflected somewhat at the site of the measuring head. In the case of measurements at a film bubble, the internal pressure in the bubble ensures that the film nestles against the sensor. In the case of measurements at flat film sheets, the deflection of the film ensures that the film lies fully against the surface of the measuring head or, if the measuring head is drum-shaped, is wrapped around the surface of the drum and over a certain length of the periphery.

Measuring heads are also known, which are not in direct contact with the film. Instead, an air cushion is produced between the film and the measuring head, so that the latter hovers a certain distance above the surface of the film. In this case also, the film should be deflected somewhat, so that the defined distance between the surface of the measuring head and the film is retained over a certain length.

Since the internal pressure, in the case of film bubbles, and the tensile stress of the film sheet in the case of flat sheets are subject to certain fluctuations, it is necessary to control the extent of the deflection, that is the depth of immersion of the measuring head in the film. For this purpose, it is known that the distance between the measuring head and the surface of the film can be measured with a measuring device, which is disposed offset to the measuring head. Since this distance varies as a function of the depth of immersion of the measuring head, it is possible to determine and control the depth of immersion indirectly. In the case of a known method, the distance is measured with the help of a scanning flap, which is held at the measuring head and grazes the surface of the film. However, in this connection, it is the disadvantage that, because of friction between the film and the scanning flap, the surface of the film once again may be damaged. In the case of a different method, the distance is measured by means of ultrasound. This method, however, is expensive and relatively inaccurate, since the film produces only a relatively weak echo. Both methods have the disadvantage that the distance measurement is carried out at a position, which is shifted from the actual position of contact between the surface of the film and the film, so that differences in the deformation geometry of the film can lead to inaccuracies.

SUMMARY OF THE INVENTION

It is an object of the invention to provide a method and an apparatus, with which an accurate and error-free measurement of the thickness becomes possible by a more precise control of the deflection of the film.

In the case of a method of the type named above, this objective is accomplished owing to the fact that the reaction force, exerted by the film on the measuring head, is measured and controlled by moving the measuring head on a specified nominal value.

Pursuant to the invention, a force measurement is carried out instead of the conventional distance measurement. The reaction force, exerted by the film on the measuring head, depends on the depth of immersion and accordingly enables this depth of immersion to be controlled at a constant value. The advantage consists therein that the force is measured directly with the help of the measuring head at the same place, at which the actual thickness measurement also takes place. A distortion of the measurement results is thus avoided.

Suitable force sensors can be obtained commercially for a large range of forces, so that the measurement of the force can be carried out relatively inexpensively and reliably with standard components. Compared to a conventional ultrasound distance measurement, a decrease in the costs of the equipment is achieved while the accuracy of the measurement is undiminished or even improved. Compared to the use of a scanning flap, there is an important advantage in that additional contact sites between the measuring head and the film are not required for the distance measurement. When a measuring head, which is in the form of a rotatable drum or which hovers on an air cushion, is used, damage to the surface of sensitive film can thus be avoided.

Preferably, the force sensor for measuring the reaction force is disposed between the measuring head and the associated holding device, which can be moved in a direction at right angles to the film with the help of a driving mechanism, such as a stepping motor. The reaction force, measured by the force sensor, is compared with a previously set nominal value and the position of the holding device is controlled with the help of the driving mechanism by means of a comparison between the actual and nominal values.

The nominal value for the reaction force is to be selected so that it corresponds to the desired depth of immersion of the measuring head in the film. The following method is suitable for this purpose. Initially, the measuring head is moved so close to the film, that it (or an air cushion) barely touches the film without deflecting it. This point can also be detected with the help of the force sensor. Subsequently, the holding device is extended further by a defined distance, which corresponds to the desired depth of immersion. With the help of a stepping motor as a driving mechanism, this distance can be set precisely, without requiring the use of an additional device for measuring the distance. When the measuring head has reached its final position, the reaction force, then exerted by the deflected film on the measuring head, is measured and stored as a nominal value. By regulating to this nominal value, the originally set depth of immersion can then be kept constant. The force sensor can be calibrated by a zero measurement before the measuring head contacts the film.

BRIEF DESCRIPTION OF THE DRAWINGS

In the following, examples of the invention are explained in greater detail by means of the drawings, in which.

DETAILED DESCRIPTION

Figure 1:
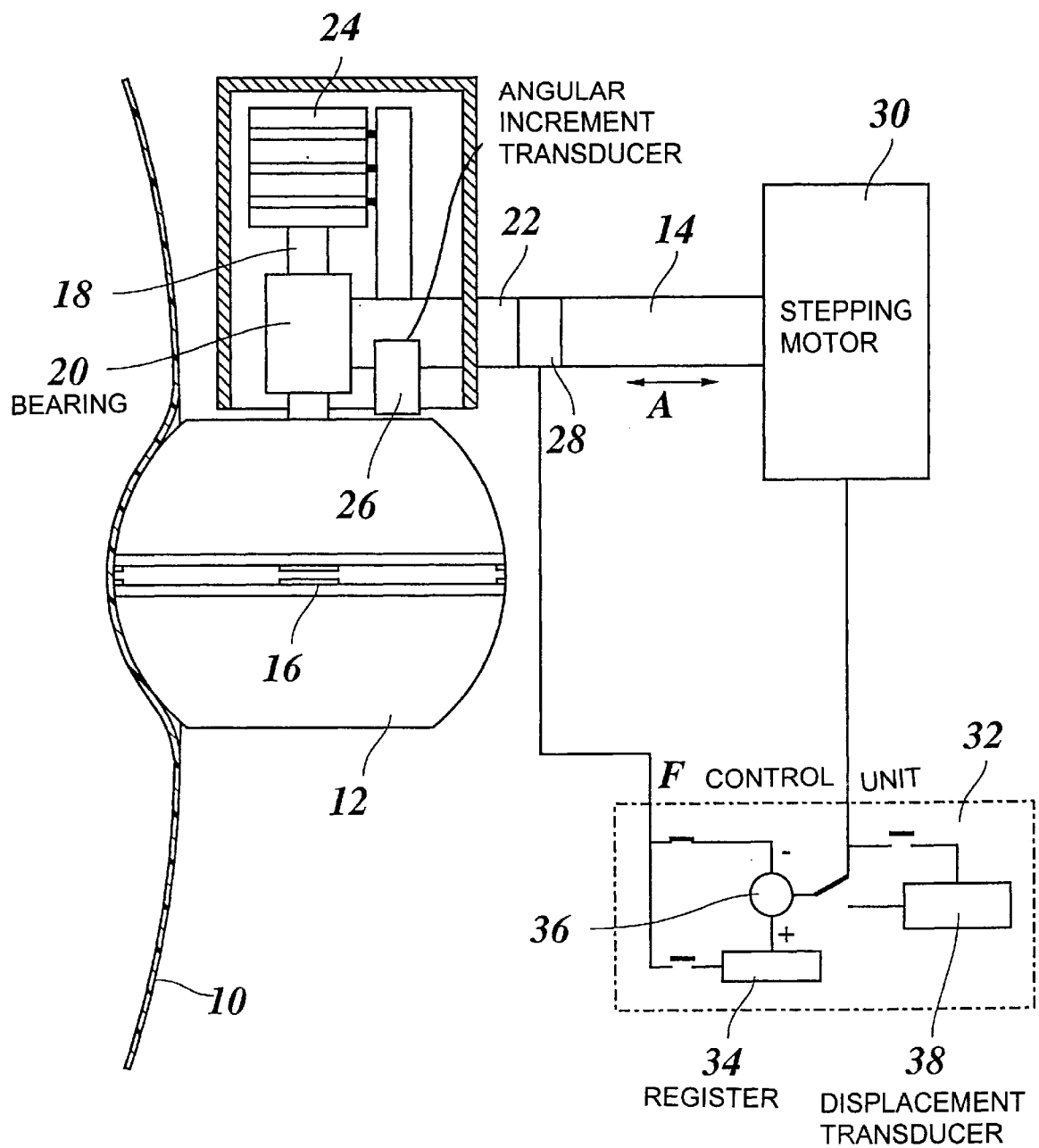
FIG. 1 shows a diagrammatic representation of a measuring head at a film bubble in plan view.

FIG. 1, in a horizontal section, shows film part of a tubular film 10, which is extruded from an extrusion die, inflated into any film bubble by internal air and drawn off in the direction perpendicular to the plane of the drawing in FIG. 1. For measuring the thickness of the film 10, a measuring head 12 is provided, which has the shape of a rotatable drum, which rolls with its slightly ball-shaped peripheral surface along the outer surface of the film 10. During the measurement, the measuring head 12 is held by a holding device 14 in a position, in which it impresses the film bubble slightly. The internal pressure of the film bubble then ensures that the film 10 nestles against the peripheral surface of the measuring head 12, so that full contact between the film 10 and the measuring head is ensured over a certain peripheral length of the measuring head.

In its middle plane, the measuring head 12 has several measurement capacitors 16, which are distributed uniformly over the periphery. When the measuring head rolls along the film 10, the measurement capacitors 16 consecutively reach the region, in which the measuring head lies against the film 10. Therefore, within a certain period of time, the film lies directly on these capacitor plates on the whole peripheral length of the measurement capacitors 16, so that the capacity of the measurement capacitors is affected by the dielectric film material. Within this period, therefore, a precise capacitive measurement of the thickness is possible. The basic principle of the capacitive measurement of thickness is known and will therefore not be explained in greater detail. However, reference is made to the parallel European patent application of the Applicant having the title "Sensor for the capacitive measurement of the film thicknesses", in which a particularly advantageous measuring arrangement is described.

The measuring head 12 is fastened to a shaft 18, which is held rotatably, with the help of a bearing 20, at the end of a bracket 22. The measurement signal is passed over slip ring contacts 24 to an evaluating circuit, which is not shown. In addition, an angular increment transducer 26, with which the angular position of the measuring head 12 can be determined, is disposed at the bracket 22.

The bracket 22 is connected over a force sensor 28 with the holding device 14. The force sensor 28 may be any conventional, commercial force sensor, which has, for example, an arrangement of strain gauges. With the help of this force sensor 28, the reaction force is measured, which is exerted by the film 10 on the measuring head 12 and transferred over the bracket 22 to the holding device 14. The axial force in the direction of the double arrow A in FIG. 1 can be measured. However, since the drum-shaped measuring head 12 in the example shown is disposed offset to the axis of the holding device 14, the torque, exerted by the film on the measuring head 12 and the bracket 22, can also be measured alternatively or additionally with the help of the force sensor 28, in order to achieve a high sensitivity.

As an example, it may be assumed that the force sensor 28 is designed to measure axial forces ranging from 0 to 200 N. An analog/digital converter, integrated in the force sensor, converts the measured force into a 17-bit signal. This corresponds to resolution of 1.5 mN. The measuring range of the force sensor 28 is selected large enough so that, on the one hand, the mechanical stresses, which are to be expected during practical use, do not lead to the destruction of the force sensor and, on the other, the reaction force of the film 10, which in practice is usually of the order 0.2 to 0.3 N, can be measured with sufficient accuracy.

The holding device 14 can be moved in and out in the direction of the double arrow A with the help of a stepping motor 30. The stepping motor 30 is controlled by pulses from a control unit 32, so that a fine adjustment of the extension of the holding device 14 is possible.

In practice, the control unit 32 is formed by a digital computer. Its mode of functioning is illustrated in the drawing by an equivalent circuit diagram.

During the thickness measurement, in the state shown in FIG. 1, the position of the measuring head 12 is varied continuously with the help of the stepping motor 30, so that the reaction force, measured by the force sensor 28, is adjusted to a nominal value, which is stored in a register 34 in the control unit 32. For this purpose, the value, stored in the register 34, is compared by a differentiating network 36 with the force F, which is measured by the force sensor 28, and the stepping motor 30 is appropriately controlled in accordance with the difference between the nominal and actual values. Accordingly, the reaction force, exerted by the film 10 on the measuring head 12 and, with that, also the depth of immersion of the measuring head 12 in the film bubble, is always kept within permissible tolerance limits at the value previously set. By these means, it is ensured that even fluctuations in the internal pressure of the film bubble do not lead to a detachment of the film 10 from the measurement capacitors 16 and, with that, bring about a distortion of the thickness measurement.

Figure 2:
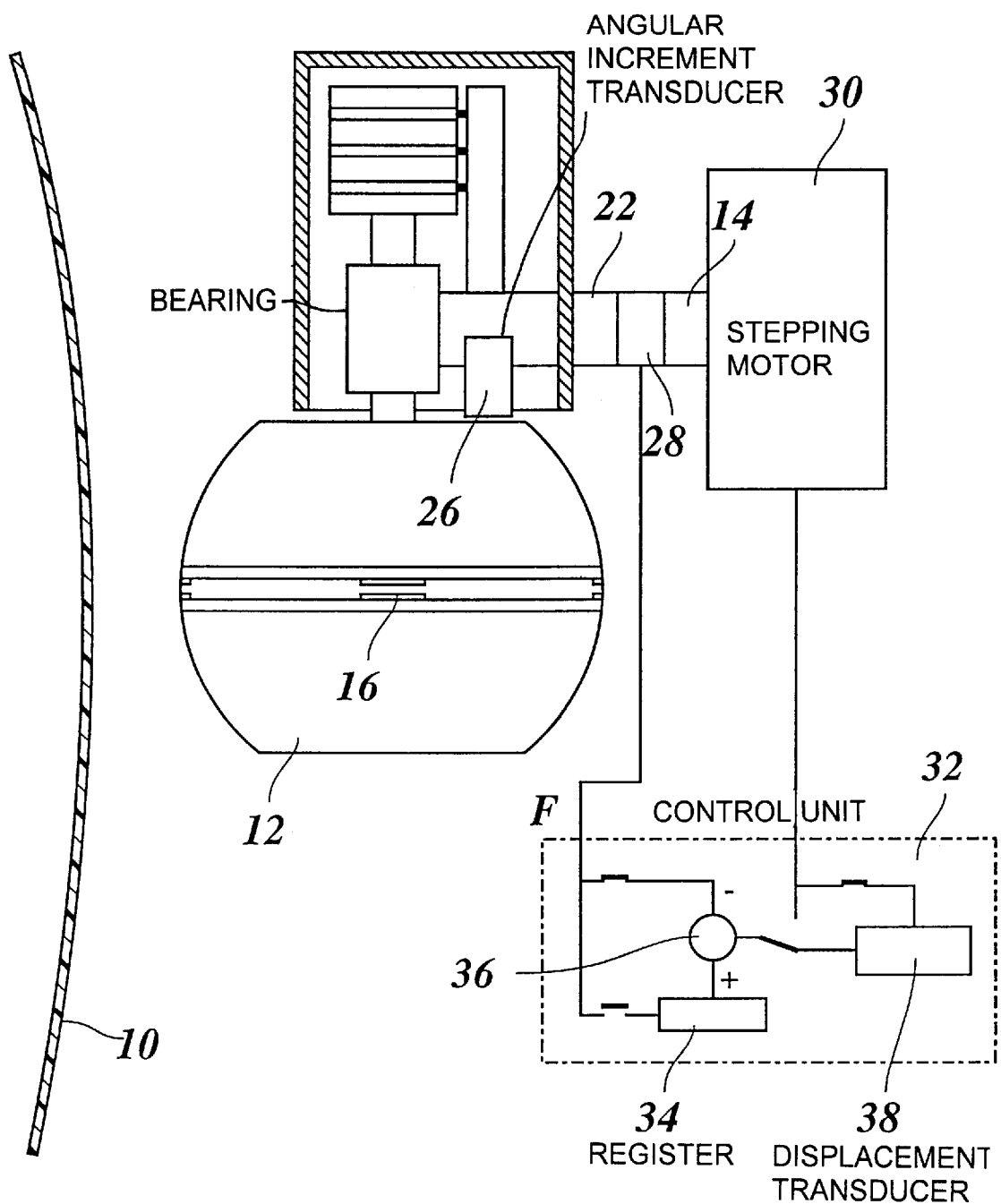
FIG. 2 shows the measuring head of FIG. 1 in the state before the start of the measurement and FIG. 3 shows the measuring head in an intermediate stage during the preparation for the measurement.

FIG. 2 illustrates the state before the start of the thickness measurement. In this state, the stepping motor 30 is separated from the differentiating network 36 and, instead, connected with a displacement transducer 38. Under the control of this displacement transducer, the holding device 14 has been retracted so far, that there is a clear distance between the measuring head 12 and the film 10. Accordingly, the film 10 does not exert any reaction force on the measuring head 12 and the signal, supplied in this case by the force sensor 28 to the control unit 32, corresponds to the force-free state. This signal is stored in the register 34 as a zero signal.

Figure 3:
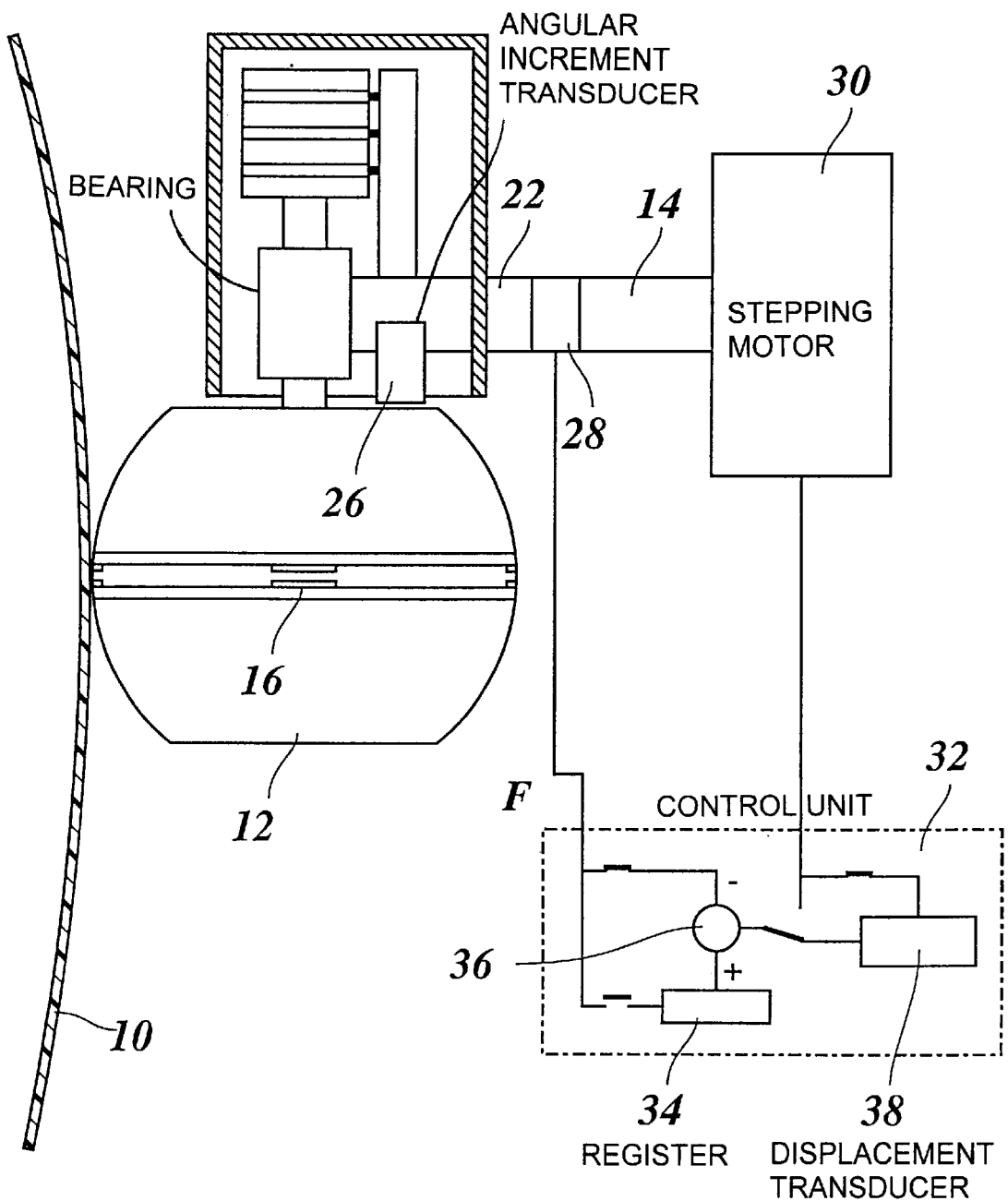

Subsequently, the register 34 is separated once again from the force sensor 28 and, with the help of the displacement transducer 38, the holding device 14 is extended slowly in the direction of the film 10. At the same time, the signal of the force sensor 28 is monitored by the differentiating network 36. As soon as the state, shown in FIG. 3, is reached, in which the measuring head 12 barely makes contact with the film 10, the force sensor 28 supplies a signal, which deviates from the zero signal stored in the register 34. This induces the displacement transducer 38 to record the position of the measuring head, reached at this instant, as a reference position. Starting out from this reference position, the holding device 14 is then extended by a pre-determined distance. This pre-determined distance corresponds to the desired depth of immersion of the measuring head 12 in the film 10 and is selected, based on the geometry of the measuring head and the physical properties of the film 10.

When the measuring head 12 reaches its targeted position (FIG. 1), the register 34 is connected briefly once again with the force sensor 28 in order to store the value, supplied at this instant by the force sensor, as a nominal value. (At the same time, the previously stored zero signal can remain stored in a separate part of the register 34.) The differentiating network 36 is then connected once again to the stepping motor 30 and the position of the measuring head 12 is controlled in the manner already described.

To record the state, which is shown in FIG. 3 and in which the measuring head 12 contacts the film 10 for the first time, the signal of the angular increment transducer 26 can also be used alternatively, since the measuring head 12, as soon as it contacts the film 10, is caused to rotate by the latter.

What is claimed is:

1. A method for measuring film thicknesses with the help of a measuring head, which is held with a holding device against a film, comprising the steps of:
   deflecting the film by a measuring head,
   measuring a reaction force, exerted by the film on the measuring head, and
   controlling the reaction force to a specified nominal value by movement of the measuring head, in response to the step of measuring.

2. The method of claim 1, further comprising the steps of:
   bringing the measuring head, before the start of the measurement, into a position in which the measuring head deflects the film, so that the film lies in contact with the measuring head over a sufficiently large area, and
   storing the value of the reaction force, measured in this position of the measuring head, as a nominal value.

3. The method of claim 2, further comprising the steps of:
   bringing the measuring head, before the start of the measurement, into a reference position in which the measuring head lies in contact with the film without deflecting the film significantly, and
   starting from this reference position, moving the measuring head by a specified distance into a final position.

4. The method of claim 3, further comprising the step of attaining and recording the reference position by measuring the reaction force.

5. An apparatus for measuring film thicknesses, comprising:
   a measuring head,
   a holding device which holds the measuring head,
   a driving mechanism for moving the holding device relative to a film so as to deflect the film for measurement, and
   a measuring device for measuring the extent to which the film is deflected by the measuring head, the measuring device including a force sensor which measures a reaction force of the film, which is transferred by the measuring head to the holding device, as a measure of deflection of the film by the measuring device.

6. The apparatus of claim 5, further comprising a control unit which records a signal of the force sensor and which controls the driving mechanism in order to adjust the reaction force to a specified nominal value.

7. The apparatus of claim 6, in which the control unit has a memory which can be connected with the force sensor for storing a nominal value for the reaction force.

8. The apparatus of claim 7, in which the control unit has a displacement transducer for storing a reference position for the measuring head and for using this reference position to control the driving mechanism to set the measuring head at a position specified in relation to this reference position.

9. The apparatus or claim 7, in which the driving mechanism includes a stepping motor.

10. The apparatus of claim 7, in which the measuring head includes a capacitive measuring head.

11. The apparatus of claim 6, in which the control unit has a displacement transducer for storing a reference position for the measuring head and for using this reference position to control the driving mechanism to set the measuring head at a position specified in relation to this reference position.

12. The apparatus of claim 11, in which the driving mechanism includes a stepping motor.

13. The apparatus of claim 11, in which the measuring head includes a capacitive measuring head.

14. The apparatus of claim 6, in which the driving mechanism includes a stepping motor.

15. The apparatus of claim 6, in which the measuring head includes a capacitive measuring head.

16. The apparatus of claim 5, in which the driving mechanism includes a stepping motor.

17. The apparatus of claim 16, in which the measuring head includes a capacitive measuring head.

18. The apparatus of claim 5, in which the measuring head includes a capacitive measuring head.

* * * * *